UNITED STATES PATENT OFFICE.

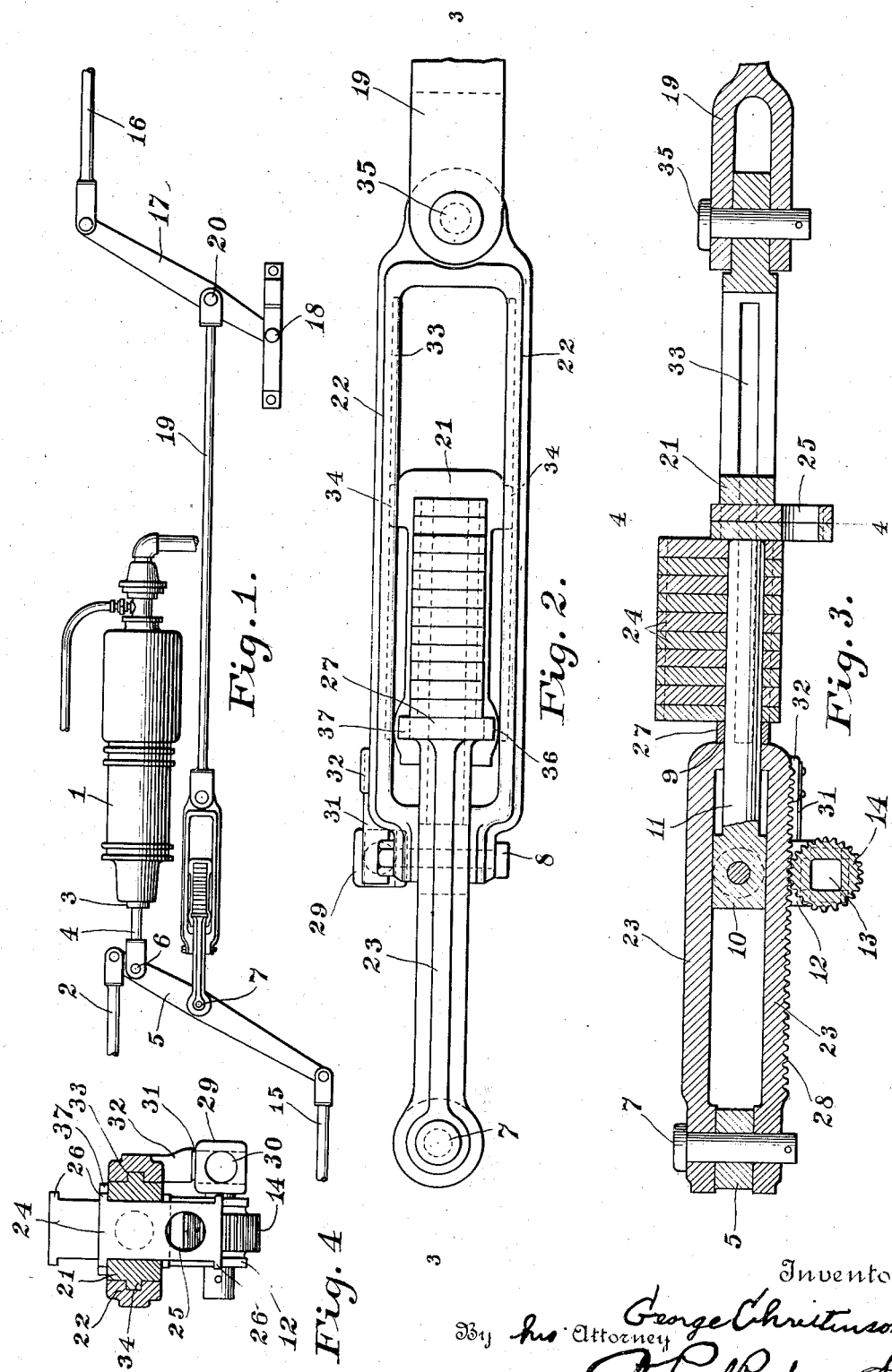

GEORGE CHRISTENSON, OF JAMAICA, NEW YORK, ASSIGNOR TO H. W. JOHNS-MANVILLE COMPANY, A CORPORATION OF NEW YORK.

SLACK TAKE-UP FOR FLUID-PRESSURE BRAKE SYSTEMS.

1,184,683.          Specification of Letters Patent.          Patented May 23, 1916.

Application filed August 2, 1915. Serial No. 43,318.

*To all whom it may concern:*

Be it known that I, GEORGE CHRISTENSON, a citizen of the United States of America, residing at Jamaica, county of Queens, State of New York, have invented certain new and useful Improvements in Slack Take-Ups for Fluid-Pressure Brake Systems, of which the following is a specification.

My invention relates to fluid pressure brake systems and consists of an improvement upon the invention disclosed in my application Serial No. 1399, filed January 9, 1915, in that it is more particularly designed for use on cars where the hand operated brake mechanism is connected to the loose push rod usually employed in the standard freight car brake rigging.

In the particular form of mechanism shown and described in my said pending application, it is evident that if the hand operated connections are applied to the floating lever of the main brake rigging at the point of said lever's atttachment to the power operated members the operation of the take-up mechanism will disarrange the adjustment of the hand brake connections, so that it might follow that the brakes could not be effectively applied by said hand operated connections. Also there is the possibility that after the parts have rusted the rod or plunger which coöperates with the series of perforated shims may not easily slip into said perforations when the apparatus is let out to take in a new set of shoes. My present invention involves a rearrangement of the parts which avoids these difficulties and causes the take-up device to operate equally well upon both the hand and power operated connections, and presents certain other features hereinafter claimed.

The best form of apparatus at present known to me embodying my invention is illustrated in the accompanying sheet of drawings, in which:

Figure 1 is a plan view of a portion of a standard brake rigging for freight cars with my invention applied thereto. Fig. 2 is an enlarged plan view of the take-up device. Fig. 3 is a vertical section on line 3—3 of Fig. 2, and Fig. 4 is a cross section on line 4—4 of Fig. 3, looking to the left.

Throughout the drawings like reference characters indicate like parts.

1, is the usual air brake cylinder having piston (not shown) with hollow piston rod 3, in which is loosely mounted the push rod 4, which is pivoted by pin 6 to the floating lever 5, of the main brake rigging.

The standard brake rigging is represented by the tension rods 15 and 16, the multiplying lever 17, pivoted to the car body at 18, and hand brake tension rod 2, all of standard construction.

My adjustable take-up mechanism comprises a special arrangement of the device embodying the set of perforated shims and coöperating plunger rod shown in my above recited prior application. In the embodiment shown in the drawings, it is designed to connect floating lever 5, with the usual tie rod 19. By operating this device to shorten the effective length of the tie-rod 19, any desired amount of slack in the brake rigging can be taken up without disturbing the adjustment of the hand brake rigging. This special form of take-up device comprises, in the embodiment shown in the drawings, a movable frame 22, connected to the rod 19, by pin 35, formed of two parallel ears arranged in a horizontal plane which slide longitudinally on the rectangular shim-holding frame 21. The frame 21, has an extension 23, which is composed of two parallel ears arranged in a vertical plane. These ears are pivoted to floating lever 5, by pin 7. As one of these ears has a series of teeth 28, cut in it to form a rack I call the entire casting the rack member. Preferably the sliding member 22, and the rack member composed of 21 and 23, are formed of malleable iron castings. The ears 22, thus have sufficient elasticity to permit them to be sprung apart to admit rectangular frame 21, between them. Ears 22, have inner guide grooves 33, which engage fins 34, on the exterior of the rear end of rectangular frame 21. The cross head 10, clamped between the outer ends of ears 22, by bolt 8, slides between the vertically arranged ears 23, which are integral with frame 21, and together with it form the rack member. This allows the rack member and the frame formed by ears 22, cross head 10, and bolt 8, to slide endwise, or telescope one within the other, but insures the continued coincidence of their longitudinal axes. Such relative movement of these two members will evidently increase or decrease the effective length of the rod 19. These movements are not caused by a pawl and ratchet movement in the particular form of my invention here illustrated, but by a rack and pinion device which comprises a pinion 14, mounted on capstan shaft 13, journaled in depending ears 12, 12, cast on the ends of ears 22. This pinion meshes with rack teeth 28, on the lower one of the vertically arranged pair of ears 23, 23. The shaft 13, has a capstan head 29, of square or other polygonal exterior cross section, provided with one or more holes 30, in which a rod or piece of gas pipe may be inserted to do the work of a capstan bar in turning shaft 13 and pinion 14.

The means for holding the parts in any particular position of adjustment comprises the plunger rod 11, extending from cross head 10, into frame 21, through a perforation at the point of juncture of frame 21, and ears 23, 23, and pressing against a set of perforated shims 24, confined in said rectangular frame 21. These shims are movable transversely in frame 21, having lugs 26, 26, at their extremities to prevent them slipping out of said frame. Each shim has a perforation 25, large enough to pass plunger 11. At the end of frame 21, adjacent to its point of juncture with ears 23, 23, it is provided with a pair of oppositely disposed grooves 36, 36, wide enough and deep enough to pass lugs 26, 26. A keeper 27, having perforation 9, large enough to pass plunger 11, and lugs 37, 37, on its upper end only, occupies these grooves 36, 36, and the space between them when the parts are assembled and prevents any of shims 24, from moving up into grooves 36, 36.

A short plate spring 31, mounted on lug 32, depending from one of the ears 22, bears on the faces of capstan head 29, and serves as a lock to prevent the capstan head and pinion 14, from turning until the spring pressure is overcome by superior force acting to rotate the capstan head, capstan shaft 13, and pinion 14.

In assembling the parts the shims 24, are slid into grooves 36, and then along frame 21, until said frame is filled up to grooves 36, 36. The keeper 27, is then inserted in said grooves and plunger 11, run through perforations 9, and 25, in keeper and shims, all shims being lifted to bring their perforations in line with said plunger. Ears 22, are then sprung apart to admit frame 21, and when said ears spring together again fins 34, 34, fit into grooves 33, 33. The perforation in cross head 10, is then brought in line with the perforations in ears 22, 22, and bolt 8, inserted and its nut screwed up. The pinion 14, capstan shaft and connected parts are mounted in depending lugs 12, 12. The device is then connected to floating lever 5, by pin 7, passing through ears 23, 23, and to tie rod 19, by pin 35.

When there are new brake shoes in use usually all shims 25, will be raised, plunger 11, passing through them all and the telescoping sets of ears 23, 23, and 22, 22, being extended one beyond the other as far as possible, thus giving the tie rod 19, its greatest effective length. After the shoes have worn enough to permit excess piston travel the inspector inserts a rod or gas pipe in a perforation 30, in capstan head 29, and turns pinion 14, in a clockwise direction (looking at Fig. 3) thus causing cross head 10, ears 22, 22, and connections to slide to the left on the rack member 21—23 shortening the effective length of the tie rod 19, by telescoping ears 22, 22, part way over ears 23, 23. As plunger 11 moves in along with cross head 10, and ears 22, 22, it is gradually withdrawn from the perforations in shims 24, and one or more of the end shims thus being deprived of the support of plunger 11, drop down. Two shims are shown thus dropped in Fig. 3. These dropped shims interpose a solid abutment between the end of plunger 11, and the end of rectangular frame 21, so that when the capstan head 29, is released from control of the operator and pinion 14, tends to rotate in a counter clockwise direction and let ears 22, 22, pull away from ears 23, 23, under the strain of a brake application, and carry plunger 11, back toward the left farther into frame 21, any such relative movement of parts is prevented.

After numerous take-up actions the brake shoes are used up and new ones must be inserted, all of shims 24, having dropped. This requires the forcing of ears 22, 22, cross head 10, and plunger 11, back to the right, shoving plunger 11 through perforations in all the shims. A rotation of the capstan head and pinion 14, in a counter clockwise direction will positively produce this desired relative movement no matter how badly the parts may have rusted, or otherwise become jammed together, assuming of course that the shims are all lifted so that their perforations 25, all come in line with plunger 11. The advantages of this form of my invention comprise its equal take-up action, preserving the relative angularity of all levers in the system uniform, the freedom from disturbing effect on the hand brake connections, and the positive action of the rack and pinion in producing motion of the parts in either direction.

It is evident that the rack and pinion take-up might be used in the other forms of my invention illustrated in co-pending applications, Serial No. 1399, filed January 9, 1915, Serial No. 43,316, filed August 2, 1915, and Serial No. 43,317 filed August 2, 1915, being substituted for the pawl and ratchet take-up there shown, and also that other forms of take-up holding devices might be substituted for the perforated shims here shown, to coöperate with the rack and pinion take-up. Other forms of take-up device might be inserted in the tie rod connection in place of the one here shown, and other forms of yielding locking device for the pinion might be substituted for the flat spring shown.

Having described my invention, I claim:

1. A slack take-up device comprising the combination of two telescoping members, a rack extending along the common line of relative motion of the telescoping members and rigidly connected to one of them, a pinion journaled on the other member meshing with the rack, and means independent of the rack and pinion for holding the telescoping members in various positions of relative adjustment.

2. A slack take-up device comprising the combination of two telescoping members, a rack extending along the common line of relative motion of the telescoping members and rigidly connected to one of them, a pinion journaled on the other member meshing with the rack, and means for holding the telescoping members in various positions of relative adjustment, said means comprising a series of shims carried by one member and movable transversely to the common line of relative motion of the two members.

3. A slack take-up device comprising the combination of two telescoping members, a rack extending along the common line of relative motion of the telescoping members and rigidly connected to one of them, a pinion journaled on the other member meshing with the rack, and means for holding the telescoping members in various positions of relative adjustment, said means comprising a series of shims carried by one member and movable transversely to the common line of relative motion of the two members, said shims having perforations normally in line one with another, and the telescoping member which does not carry the shims, having a plunger adapted to enter said perforation in the shims, when they are in line with said plunger.

4. A slack take-up device comprising in combination a rack member, a second member sliding on said rack member, a pinion journaled on said second member and meshing with the rack, a series of perforated shims mounted in the rack member and movable transversely thereof, a plunger carried by said second member in line with the shims and adapted to enter the perforations therein when the shims are in one position but out of line with said perforations when the shims have been shifted to another position, and means for rotating the pinion.

5. A slack take-up device comprising in combination a rack member composed of a pair of parallel ears located in a vertical plane, one of which ears is provided with teeth on its exterior and a rectangular frame arranged in a horizontal plane, a series of perforated shims located in said rectangular frame and movable vertically therein, a second member composed of a pair of parallel ears located in a horizontal plane and sliding on the exterior of the rectangular frame, a cross-head bolted between the extremities of said last mentioned ears and sliding between the ears of the rack member, a plunger carried by said cross-head in line with the perforations in the shims when the same are raised and abutting against the shims when lowered, a pinion journaled on the second member and meshing with the teeth on the rack member, and means for rotating said pinion.

6. A slack take-up device comprising in combination a rack member composed of a pair of parallel ears located in a vertical plane, one of which ears is provided with teeth on its exterior and a rectangular frame arranged in a horizontal plane, a series of perforated shims located in said rectangular frame and movable vertically therein, a second member composed of a pair of parallel ears located in a horizontal plane and sliding on the exterior of the rectangular frame, a cross-head bolted between the extremities of said last mentioned ears and sliding between the ears of the rack member, a plunger carried by said cross-head in line with the perforations in the shims when the same are raised and abutting against the shims when lowered, a pinion journaled on the second member and meshing with the teeth on the rack member, and means for rotating said pinion, said means comprising a capstan head rigidly connected to the pinion.

7. A slack take-up device comprising in combination a rack member composed of a pair of parallel ears located in a vertical plane, one of which ears is provided with teeth on its exterior and a rectangular frame arranged in a horizontal plane, a series of perforated shims located in said rectangular frame and movable vertically therein, a second member composed of a pair of parallel ears located in a horizontal plane and sliding on the exterior of the rectangular frame, a cross-head bolted between the extremities of said last mentioned ears and sliding between the ears of the rack member, a plunger carried by said cross-head in line with the perforations in the shims when the same are raised and abutting against the shims when lowered, a pinion journaled on the second member and meshing with the teeth on the rack member, and means for rotating said pinion, said means comprising a capstan head rigidly connected to the pinion, together with a flat spring carried by the rack member and bearing on the capstan head to prevent its rotation except when the resiliency of said spring is overcome by an applied force.

8. A slack take-up device comprising the combination of two telescoping members, a rack extending along the common line of relative motion of the telescoping members and rigidly connected to one of them, a pinion journaled on the other member meshing with the rack, and means for holding the telescoping members in various positions of relative adjustment, together with yielding means normally tending to prevent the rotation of the pinion.

9. The combination with the rigging of a power brake system for railroad cars of a pair of telescoping members included in the line of connections of said rigging, one of said members being provided with a rack, and the other with a pinion meshing with said rack, together with means for rotating said pinion in either direction, and means for holding the telescoping members in different positions of adjustment produced by the rotation of said pinion.

10. The combination with the rigging of a power brake system for railroad cars of a pair of telescoping members included in the tie rod connections of said rigging, one of said members being provided with a rack, and the other with a pinion meshing with said rack, together with means for rotating said pinion in either direction, and means for holding the telescoping members in different positions of adjustment produced by the rotation of said pinion.

11. In a take-up apparatus for fluid pressure brake systems the combination of a frame attached to one element of the brake system, a rod movable longitudinally with reference to the frame and connected to another element of the brake system, means for holding the rod in various positions of adjustment with reference to the frame, and manually operated means for producing said adjustments which are independent of the holding means.

12. As an element in a take-up apparatus for fluid pressure brake systems the combination of a rectangular frame having a perforation at one end and partly cut-away portions adjacent thereto, a rod adapted to slide in said perforation, a series of perforated shims movable transversely in said frame provided with lugs at either end limiting their transverse movement except when opposite said cutaway portions, and a keeper adapted to fill said cutaway portions, in the frame and interlock with said rod against transverse movement when all parts are in operative position.

GEORGE CHRISTENSON.

Witnesses:
 A. PARKER-SMITH,
 M. G. CRAWFORD.